US008875694B2

(12) United States Patent
Cherington et al.

(10) Patent No.: US 8,875,694 B2
(45) Date of Patent: Nov. 4, 2014

(54) CONVERGING-DIVERGING COMBUSTION ZONES FOR FURNACE HEAT EXCHANGES

(75) Inventors: Floyd E. Cherington, Carrollton, TX (US); Shailesh S. Manohar, Coppell, TX (US); Hans J. Paller, Double Oak, TX (US); John W. Whitesitt, Garland, TX (US)

(73) Assignee: Lennox Industries, Inc., Richardson, TX (US)

( * ) Notice: Subject to any disclaimer, the term of this patent is extended or adjusted under 35 U.S.C. 154(b) by 1020 days.

(21) Appl. No.: 12/834,123

(22) Filed: Jul. 12, 2010

(65) Prior Publication Data

US 2011/0174287 A1    Jul. 21, 2011

Related U.S. Application Data

(60) Provisional application No. 61/295,501, filed on Jan. 15, 2010.

(51) Int. Cl.
  *F24H 3/00*    (2006.01)
  *F23C 3/00*    (2006.01)

(52) U.S. Cl.
  CPC .................................... *F23C 3/002* (2013.01)
  USPC ...................................... 126/99 R; 165/170

(58) Field of Classification Search
  USPC ...... 126/109, 110 B, 110 C, 112, 116 R, 522, 126/523, 524, 531, 58, 99 A, 99 R; 165/170
  See application file for complete search history.

(56) References Cited

U.S. PATENT DOCUMENTS

| 3,359,964 | A |   | 12/1967 | Wilson, Sr. |   |
|---|---|---|---|---|---|
| 3,786,799 | A |   | 1/1974 | Cox |   |
| 3,963,018 | A |   | 6/1976 | Schultz |   |
| 4,319,557 | A |   | 3/1982 | Sietmann et al. |   |
| 4,426,937 | A |   | 1/1984 | Sietmann et al. |   |
| 4,467,780 | A | * | 8/1984 | Ripka ....................... | 126/110 R |
| 4,542,734 | A |   | 9/1985 | Trent et al. |   |
| 4,739,746 | A | * | 4/1988 | Tomlinson ................ | 126/110 R |

(Continued)

FOREIGN PATENT DOCUMENTS

| CA | 766537 A | 9/1967 |
|---|---|---|
| CA | 2358247 A1 | 4/2002 |

(Continued)

OTHER PUBLICATIONS

Communication From a Related Counterpart Application, Chinese Application No. 2010105951448; Chinese Office Action dated May 28, 2014, 20 pages.

*Primary Examiner* — Stephen M Hepperle
*Assistant Examiner* — R. K. Arundale

(57) ABSTRACT

A furnace unit that comprises a burner assembly having at least one burner located therein and a heat exchanger having at least one continuous combustion tube. One end of the combustion tube has a first opening that is coupled to the burner assembly. The combustion tube has at least three zones. A first surface of the first zone has a first non-straight angle with a second surface of the second zone. The second surface has a second non-straight angle with a third surface of the third zone. The first zone is nearest of the three zones to the burner assembly and the second zone is in-between the first zone and the third zone. The first, second and third zones are within a flame length configured to be emitted from the burner.

13 Claims, 11 Drawing Sheets

(56) References Cited

U.S. PATENT DOCUMENTS

| | | | |
|---|---|---|---|
| 5,042,453 A * | 8/1991 | Shellenberger | 126/110 R |
| 5,060,722 A * | 10/1991 | Zdenek et al. | 165/170 |
| 5,094,224 A * | 3/1992 | Diesch | 126/110 R |
| 5,113,844 A * | 5/1992 | Cook | 126/110 R |
| 5,178,124 A | 1/1993 | Lu et al. | |
| 5,346,001 A * | 9/1994 | Rieke et al. | 165/170 |
| 5,359,989 A * | 11/1994 | Chase et al. | 126/110 R |
| 5,575,330 A * | 11/1996 | Hoeffken | 165/170 |
| 5,681,159 A * | 10/1997 | Benedek et al. | 431/9 |
| 5,749,355 A | 5/1998 | Roan et al. | |
| 5,988,157 A | 11/1999 | Brown et al. | |
| 6,422,306 B1 * | 7/2002 | Tomlinson et al. | 165/170 |
| 6,793,015 B1 * | 9/2004 | Brown et al. | 165/170 |
| 6,889,686 B2 * | 5/2005 | Specht | 126/110 R |
| 6,938,688 B2 * | 9/2005 | Lengauer et al. | 165/170 |
| 7,044,123 B2 * | 5/2006 | Rigamonti | 126/109 |
| 2002/0040777 A1 | 4/2002 | Tomlinson et al. | |
| 2008/0314375 A1 * | 12/2008 | Khan | 126/116 R |
| 2011/0174291 A1 * | 7/2011 | Manohar et al. | 126/112 |
| 2012/0180774 A1 * | 7/2012 | Reifel et al. | 126/116 R |
| 2013/0037013 A1 * | 2/2013 | Roy et al. | 126/116 R |

FOREIGN PATENT DOCUMENTS

| | | |
|---|---|---|
| CA | 2358598 A1 | 4/2002 |
| FR | 2208503 A5 | 6/1974 |
| JP | H07188735 A | 7/1995 |
| JP | 7305833 A | 11/1995 |

\* cited by examiner

CONVERGING-DIVERGING COMBUSTION ZONES FOR FURNACE HEAT EXCHANGES

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety.

TECHNICAL FIELD

This application is directed, in general, to a heating furnace unit, and more specifically, to a heating furnace unit that employs a heat exchanger unit having a converging-diverging combustion zone.

BACKGROUND

Current furnace heat exchanger flames are long. For example the flame's length that can extend substantially through one or more passes of a heat conduction tube of the heat exchanger. As a result, the flame can distribute heat over a substantial length of the heat exchanger's heat conduction tube. In the presence of such a long flame, however, it is often not desirable to have intrusive heat transfer enhancements (e.g., dimples) because there is a significant danger of overheating the heat exchanger, or, of quenching the flame and producing carbon monoxide (CO). Consequently, the first pass of a furnace heat exchanger often runs cooler than desired, and thus represents inefficiently used surface area for heat exchange. Another consequence of using a long flame can be poor mixing between the fuel (e.g., natural gas or propane) and air. This, in turn, can result in CO or soot production under certain operating conditions.

SUMMARY

One embodiment of the present disclosure is a heating furnace unit. The unit comprises a burner assembly having at least one burner located therein and a heat exchanger having at least one continuous combustion tube. One end of the combustion tube has a first opening that is coupled to the burner assembly. The combustion tube has at least three zones. A first outer surface of the first zone has a first non-straight exterior angle with a second outer surface of the second zone. The second outer surface has a second non-straight exterior angle with a third outer surface of the third zone. The first zone is nearest of the three zones to the burner assembly and the second zone is in-between the first zone and the third zone. The first, second and third zones are within a flame length configured to be emitted from the burner.

Another embodiment of the present disclosure is a method of manufacturing a heating furnace unit. The method comprises providing a burner assembly having at least one burner located therein and providing the above-described combustion tube of a heat exchanger. The method also comprises coupling one end of the combustion tube to the burner assembly such that the at least one burner can emit a flame into an opening in the one end.

BRIEF DESCRIPTION OF THE DRAWINGS

Reference is now made to the following descriptions taken in conjunction with the accompanying drawings, in which.

DETAILED DESCRIPTION

Embodiments of the present disclosure enhance fuel air mixing, and hence promote heat release, early in the length of the flame, and, thereby use the heat exchanger's surface area more efficiently, and, allows for cleaner burning of the fuel. In particular, as further disclosed herein, it was discovered that such efficiencies are facilitated by the presence of one or more diverging or converging zones in a combustion tube.

Figure 1:
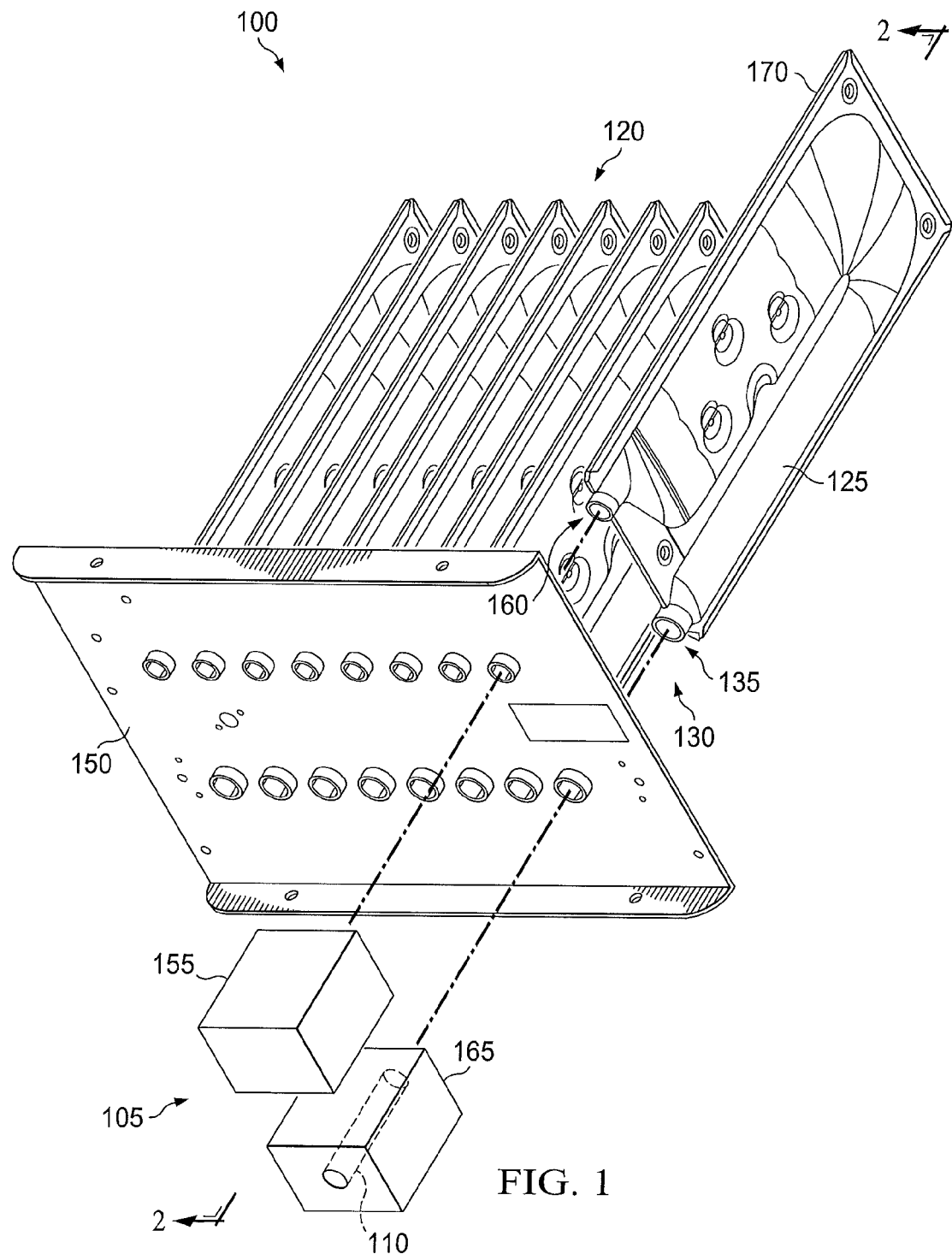
FIG. 1 presents an exploded perspective view of an example embodiment of selected portions of an heating furnace unit of the disclosure.

One embodiment of the present disclosure is a heating furnace unit. FIG. 1 presents a perspective view of an example embodiment of selected portions of a heating furnace unit 100 of the disclosure. Some overlying features (e.g., some of the unit's top and side panel covers) are not shown so as to more clearly depict internal features of the unit 100. In some cases the heating furnace unit 100 can be part of a heating, ventilating and air conditioning unit (HVAC).

Figure 2:
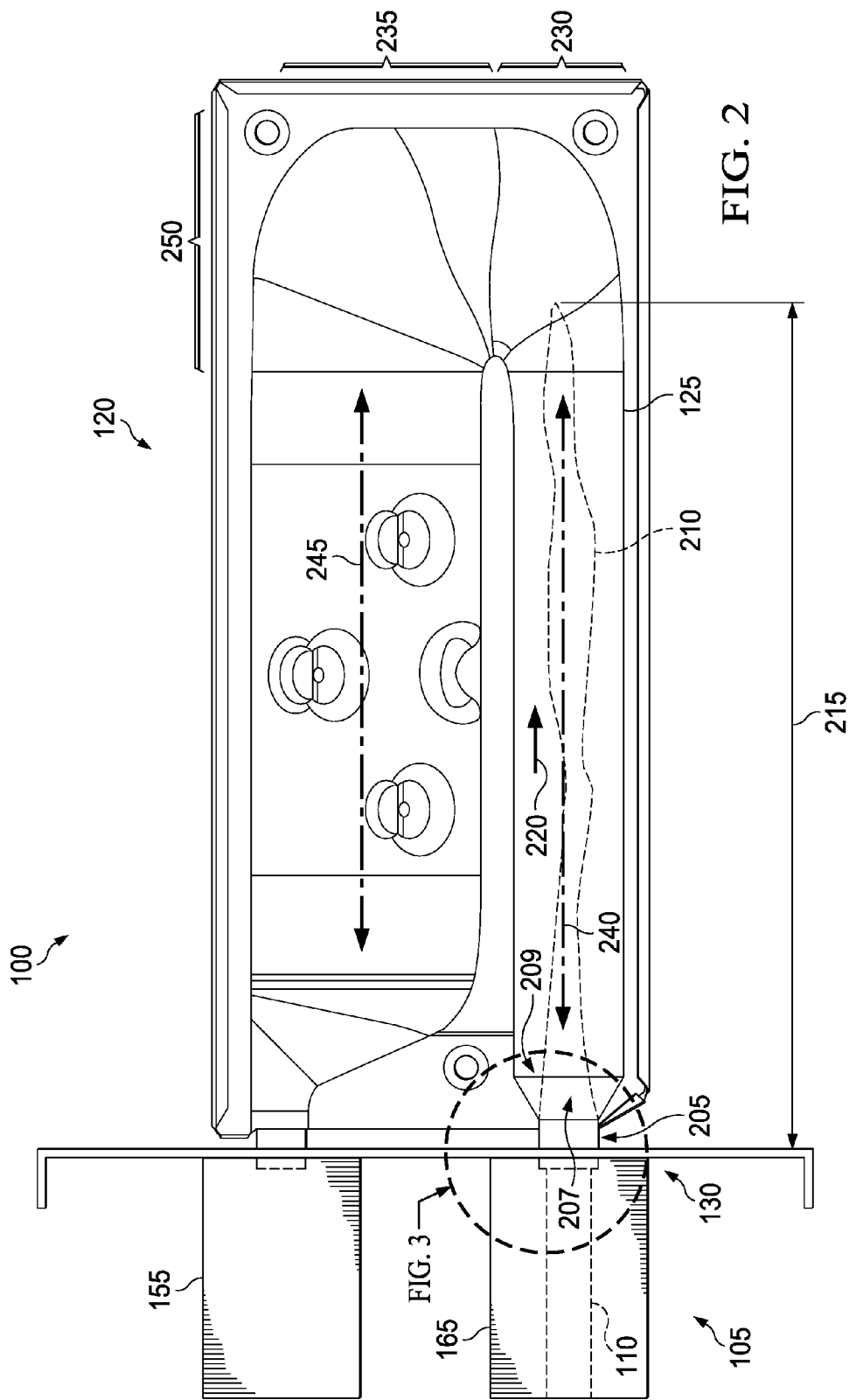
FIG. 2 presents a cross-sectional view of the example unit presented in FIG. 1, along view line 2-2.

The heating furnace unit 100 comprises a burner assembly 105 having at least one burner 110 located therein. The unit 100 also comprises a heat exchanger 120 having at least one continuous combustion tube 125. One end 130 of the combustion tube 125 has an opening 135 that is coupled to the burner assembly 105. For example, in some embodiments, the coupling can include direct mechanical coupling while in other case the coupling can include fluid coupling with no direct mechanical contact. The combustion tube 125 has at least three zones 205, 207, 209. The first zone 205 of the combustion tube 125 is nearest of the three zones 205, 207, 209 to the burner assembly 105 (FIG. 2). The second zone 207 is in-between the first zone 205 and the third zone 209. The first zone 205, second zone 207 and third zone 209 are all within a flame 210 length 215 configured to be emitted from the burner 110 (FIG. 2). That is, the zones 205, 207, 209 are in a combustion zone of the tube 125.

The term zone, as used herein, refers to a section of the combustion tube whose surface (e.g., outer and inner surface, or in some cases only the inner surface) forms a non-straight angle or angles (e.g., acute, right, obtuse or reflex angles) with respect to the surface or surfaces of the adjacent zone or zones. When the surface refers to an inner surface of the tube 125, the non-straight angle or angles refer to interior angles of the surface. When the surface refers to an inner surface and an outer surface of the tube 125, the non-straight angle or angles refer to both interior angles of the inner surface and the corresponding exterior angle of the outer surface. In some embodiments, the interior angle and corresponding exterior angle are related by the relationship that the sum of the two angles equals 360 degrees.

Figure 3A:
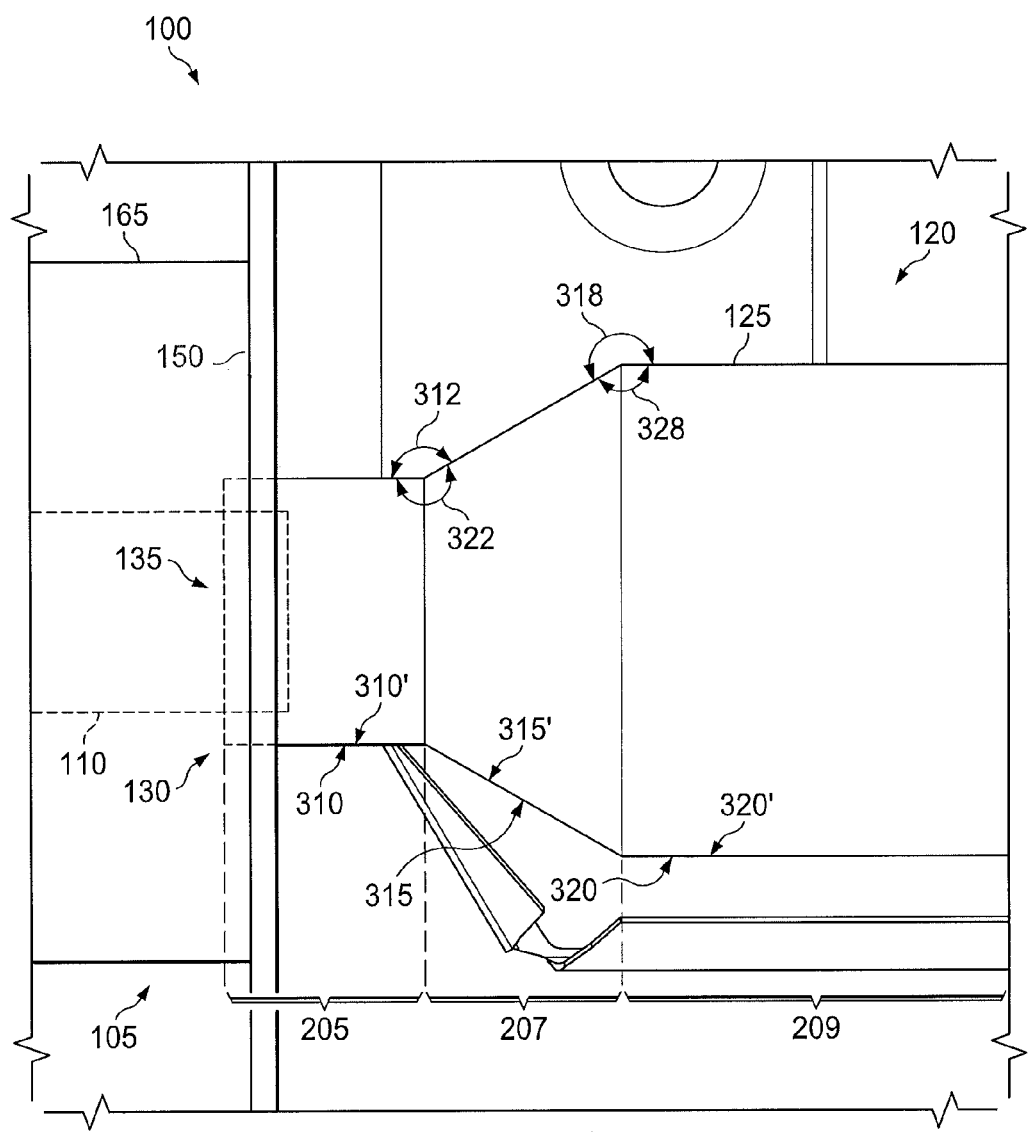
FIG. 3A presents detailed cross-sectional view of a portion of the unit presented in FIG. 2, corresponding to view 3.

For instance, as illustrated for the example embodiment shown in FIG. 3A, a first outer surface 310 of the first zone 205 has a first non-straight angle 312 (e.g., an obtuse exterior angle) with a second outer surface 315 of the second zone 207 of the combustion tube 125. The second surface 315 has a second non-straight angle 318 (e.g., another obtuse exterior angle) with a third outer surface 320 of the third zone 209 of the combustion tube 125. For such an embodiment, there is also an inner surface 310' (e.g., the inner surface 310' opposite the outer surface 310 of the tube 125) of the first zone 205 that has a first non-straight angle 322 (e.g., an obtuse interior angle) with a second inner surface 315' (e.g., the inner surface 315' opposite the outer surface 315) of the second zone 207 of the combustion tube 125. The second inner surface 315' has a second non-straight angle 328 (e.g., another obtuse interior angle) with a third inner surface (e.g., the inner surface 315' opposite the outer surface 320) of the third zone 209 of the combustion tube 125. The sum of exterior angle 312 and interior angle 322 equals 360 degrees, and, the sum of exterior angle 318 and interior angle 328 equals 360 degrees.

Figure 3B:
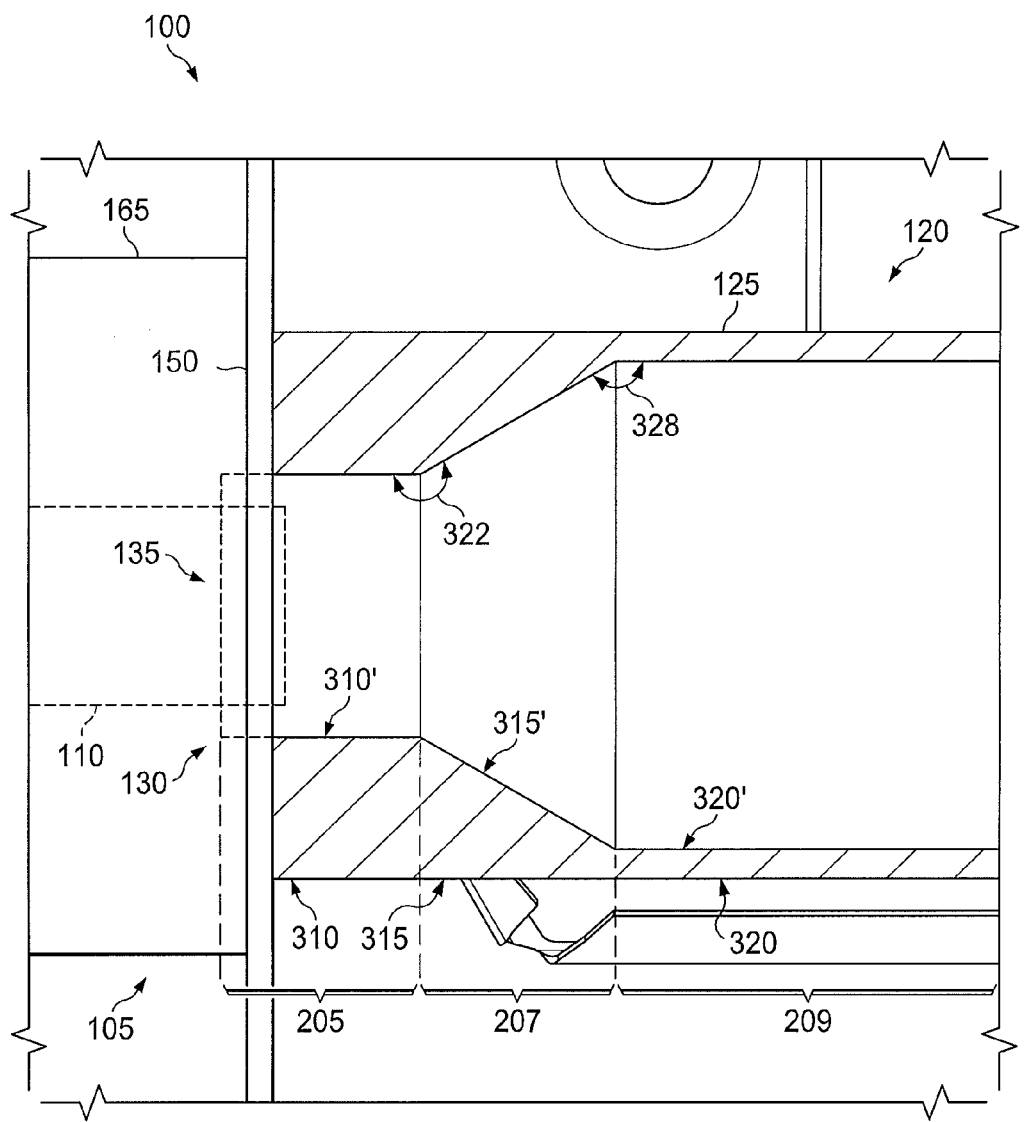
FIG. 3B presents an alternative embodiment of the portion of the unit depicted in 3A.

In still other embodiments, the outer surfaces 310, 315, 320 may not have non-straight exterior angles. For instance, as depicted in FIG. 3B, the outer surfaces 310, 315, 320 of the zones 205, 207, 209 of the combustion tube 125 can be straight while the inner surfaces 310', 315', 320' form non-straight interior angles 322, 328 similar to that discussed above in the context of FIG. 3A.

In some embodiments of the unit 100, such as depicted in FIGS. 1-3A, the second zone 207 is a diverging zone, with the first non-straight exterior angle 312 and interior angle 322 (or interior angle 322 only in some embodiments) between 0 and 180 degrees. For instance, in some preferred embodiments, the angle 312 (and/or angle 322) is in a range from about 125 and 145 degrees. In some such embodiments, as also illustrated in FIG. 3A, the first zone 205 and third zone 209 can be substantially straight zones. For instance, in such embodiments, the surfaces 310, 320 (and/or surfaces 310' and 320') of the first and third zones 205, 209 are preferably substantially parallel (e.g., within 10 degrees) to an intended direction 220 of the flame 210 emitted by the burner 110 (FIG. 2). For instance, in some such embodiments, the non-straight second exterior angle 318 preferably equals 360 degrees minus the first non-straight exterior angle 312 in degrees. Other embodiments can include such features for the interior angles 322, 328 alone or in combination with the exterior angles 312, 318. In some embodiments of the unit 100, as further illustrated in FIG. 3A, the second zone's 207 outer surface 315 (and/or inner surface 315') can linearly diverge from the first zone 205 to the third zone 209.

There are numerous other configurations that the zones 205, 207, 209 of the combustion tube 125 can have to enhance fuel air mixing. This is further illustrated in FIGS. 4A-J, which present cross-sectional views of example embodiments of a portion of the combustion tube 125, analogous to the view presented in FIG. 3A. For clarity in the examples to follow, the outer surfaces 310, 315, 320 and non-straight exterior angles 312, 318 of the combustion tube 125 are mainly discussed. However, based on the forgoing disclosure, one skilled in the art would appreciate that the analogous properties would apply to the inner surfaces 310', 315', 320' and interior angles 322, 328, either alone, or in combination with the outer surfaces 310, 315, 320 and non-straight exterior angles 312, 318 properties described herein.

Figure 4A:
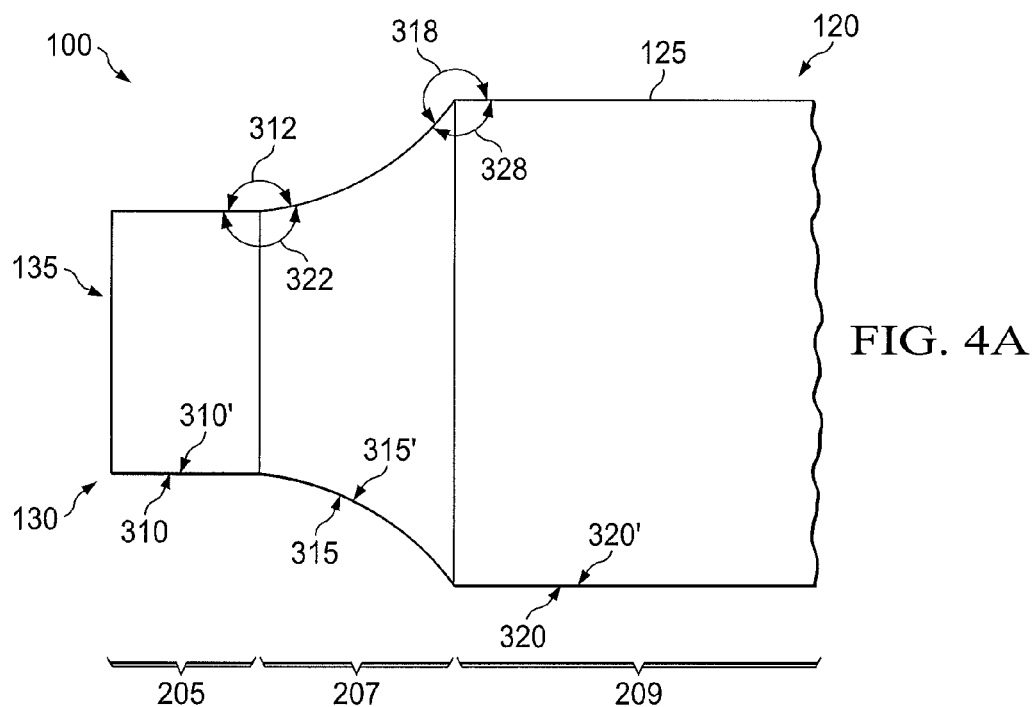
FIGS. 4A-J presents a cross-sectional views of other example embodiments of a combustion tube of the unit of the disclosure, analogous to the view presented in FIG. 3A.
Figure 4B:
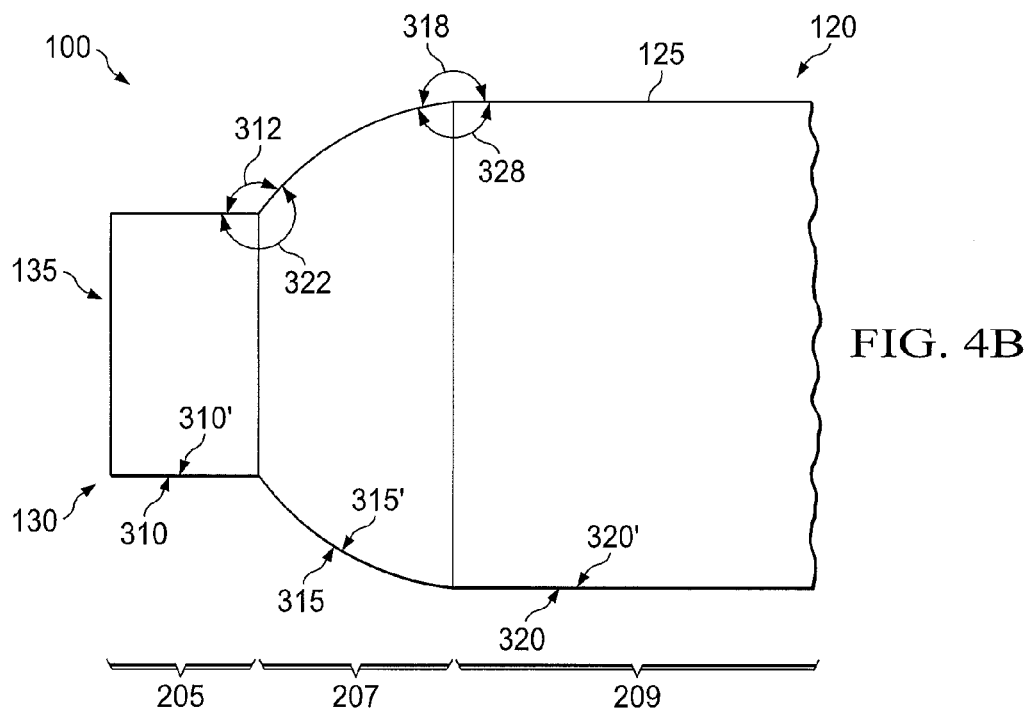

In some embodiments, the second outer surface of the second zone curvilinearly diverges from the first zone to the third zone. For instance, as shown in FIG. 4A, the second outer surface 315 can form a concave surface (and/or convex inner surface 315') that diverges (converges) from the first zone 205 to the third zone 209. In some embodiments, as shown in FIG. 4B the second outer surface 315 can form a convex surface (and/or concave inner surface 315') that diverges (converges) from the first zone 205 to the third zone 209.

Figure 4C:
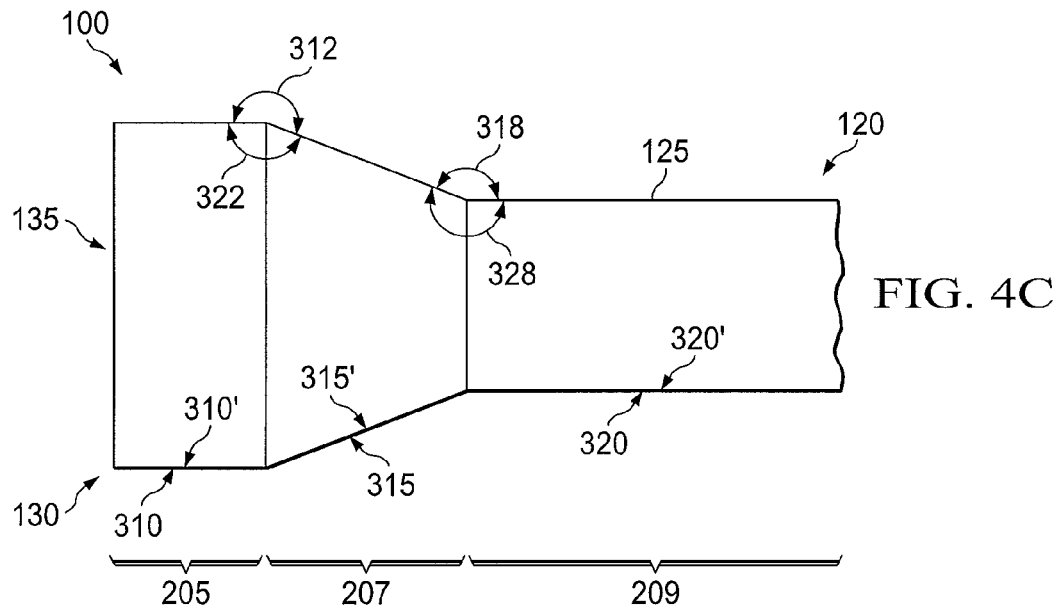

In some embodiments of the unit 100, such as depicted in FIG. 4C, the second zone 207 is a converging zone, with the first non-straight exterior angle 312 being greater than 180 degrees (and/or the interior angle 322 less than 180 degrees). For instance, in some embodiments, the angle 312 is an exterior angle in a range from about 180 to 270 degrees, and in some cases, from about 215 to 235 degrees. For instance, in some embodiments, the angle 322 is an interior angle in a range from about 0 to 90 degrees, and in some cases, from about 35 to 55 degrees. Similar to some embodiments discussed in the context of FIG. 3A, as illustrated in FIG. 4C, in cases where the second zone 207 is a converging zone, the first zone 205 and third zone 209 can be substantially straight zones. For instance, in such embodiments, the surfaces 310, 320 (and/or surfaces 310', 320') of the first and third zones 205, 209 are preferably substantially parallel (e.g., within 10 degrees) to an intended direction 220 of the flame 210 emitted by the burner 110 (FIG. 2). For instance, in some such embodiments, the non-straight exterior angle 318 preferably equals 360 degrees minus the first non-straight exterior angle 312 (in degrees). Similar to some embodiments discussed in the context of FIG. 3A, the second zone's 207 outer surface 315 (and/or inner surface 315') can linearly or curvilinearly converge from the first zone 205 to the third zone 209.

Figure 4D:
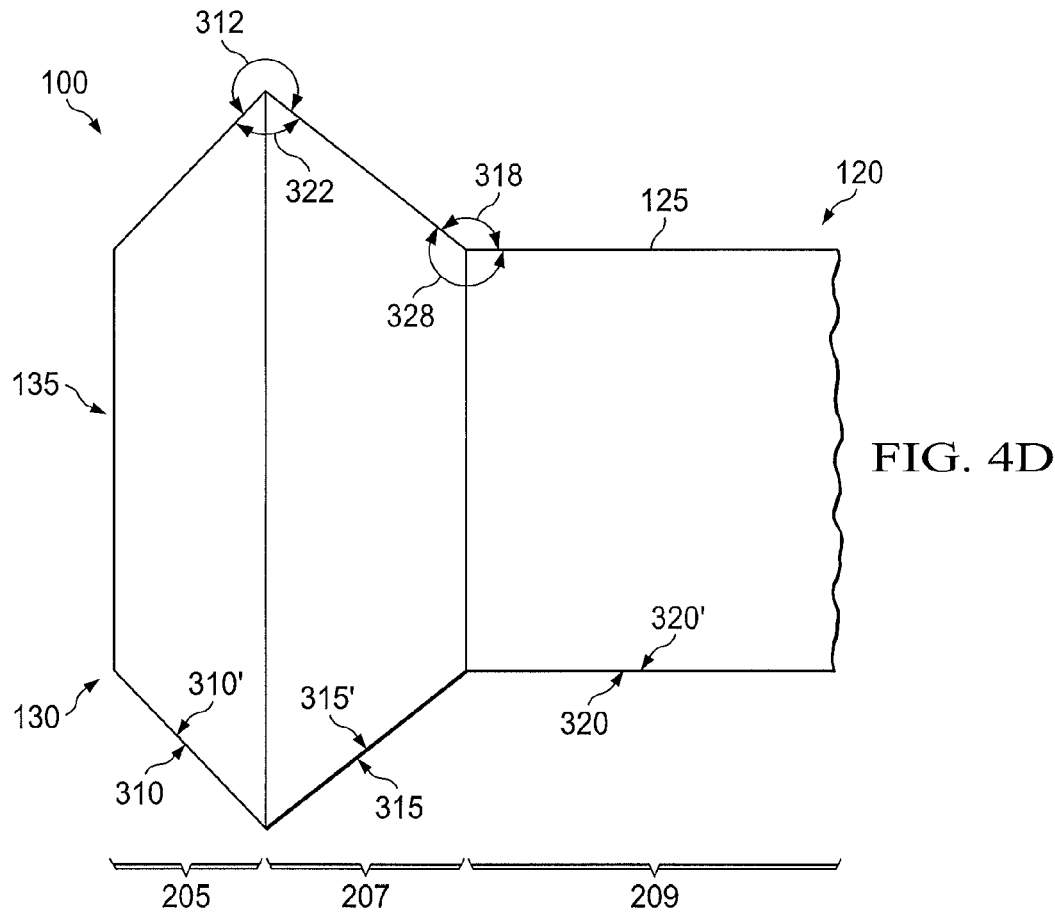
Figure 4E:
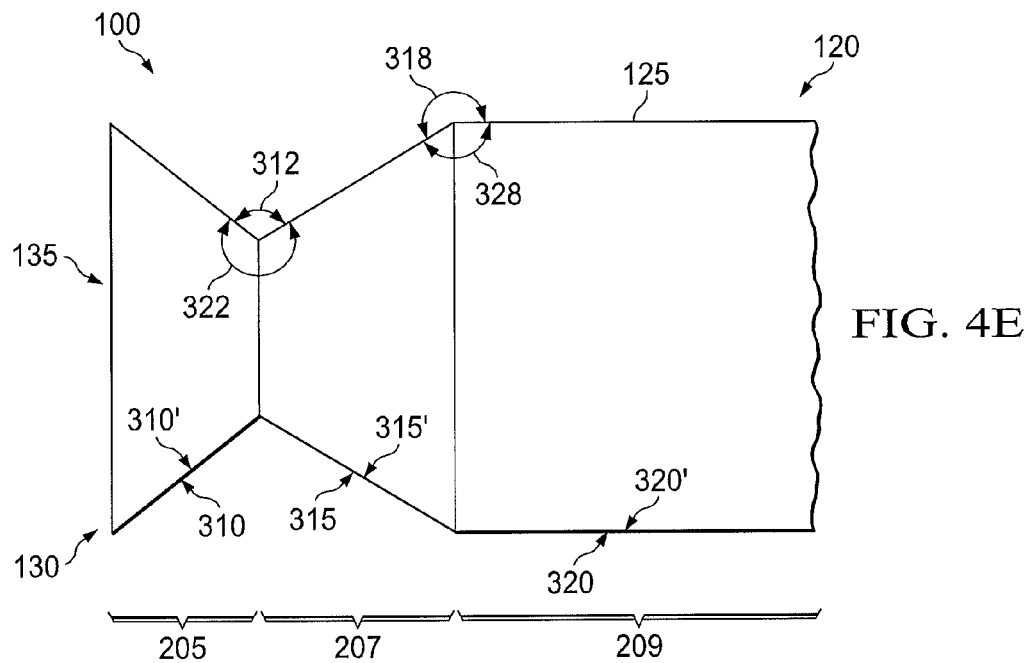

In some embodiments, more than one of the zones 205, 207, 209 can be converging or diverging zones. For instance, as illustrated in FIGS. 4D and 4E, the first zone 205 can be configured as one of diverging (FIG. 4D) or converging (FIG. 4E) from the one end 130 of the combustion tube 125 to the second zone 207, and the second zone 207 can be configured as the other of converging (FIG. 4D) or diverging (FIG. 4E) from the first zone 205 to the third zone 209. In some such embodiments, as further shown in FIGS. 4D and 4E, the third zone 209 can be configured as a straight zone.

Figure 4F:
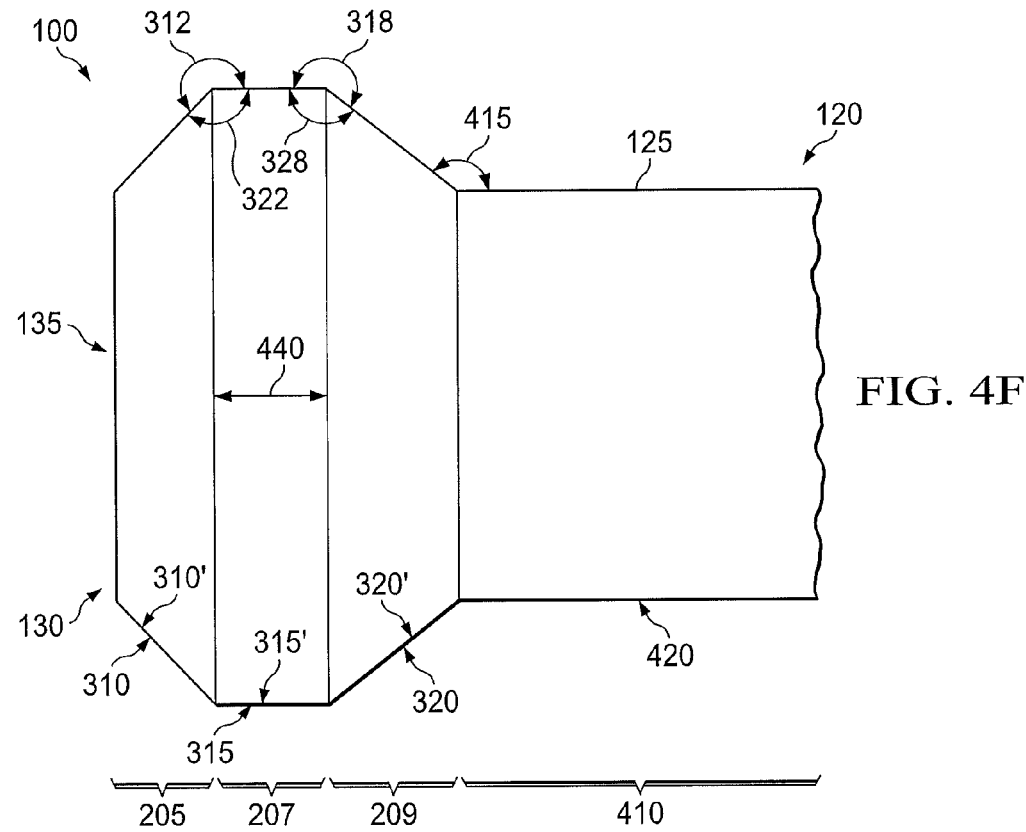
Figure 4G:
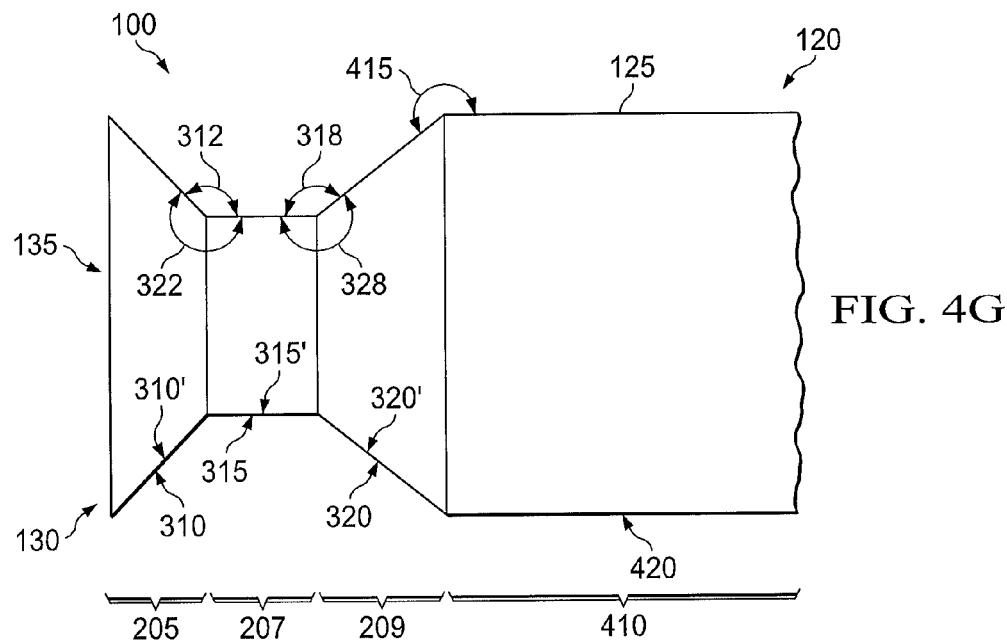

For instance, as shown FIGS. 4F and 4G, the first zone 205 can be configured as one of diverging (FIG. 4F) or converging (FIG. 4G) from the one end 130 of the combustion tube 125 to the second zone 207, and the third zone 209 can be configured as the other of converging (FIG. 4F) or diverging (FIG. 4G) from the second zone 207 to a fourth zone 410 of the combustion tube 125. The fourth zone 410 is located farther from the one end 130 of the tube 125 than the three zones 205, 207, 209. In some such embodiments, the third outer surface 320 of the third zone 209 can have a third non-straight exterior angle 415 with a fourth outer surface 420 of the third zone 410 of the combustion tube 125. As also illustrated in FIGS. 4F and 4G, in some cases, one or both of the second zone 207 and fourth zone 410 can be configured as straight zones.

Figure 4H:
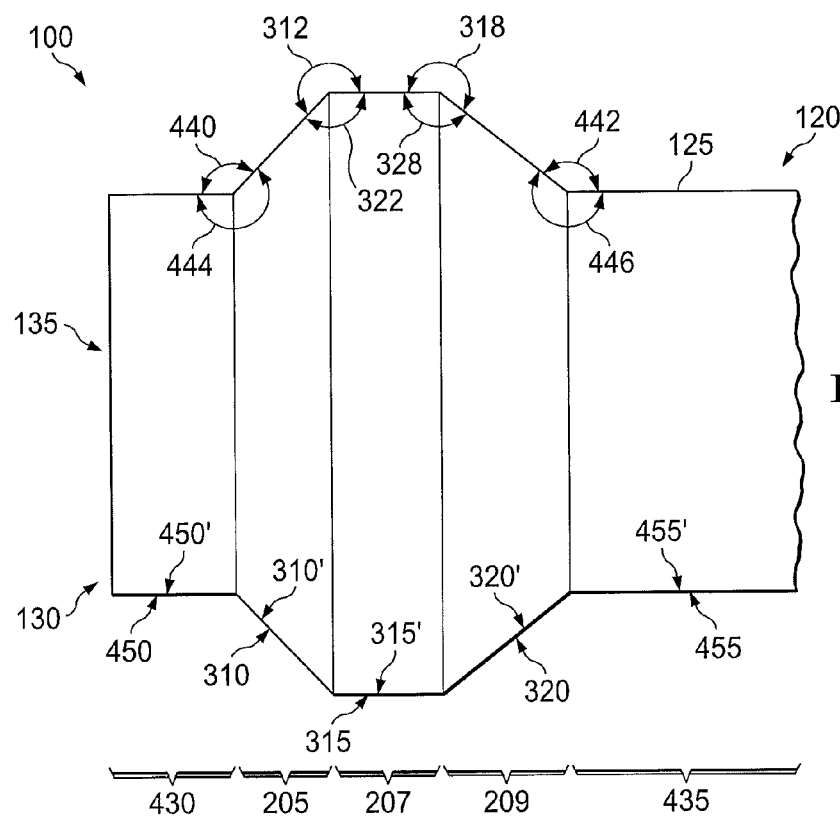
Figure 4I:
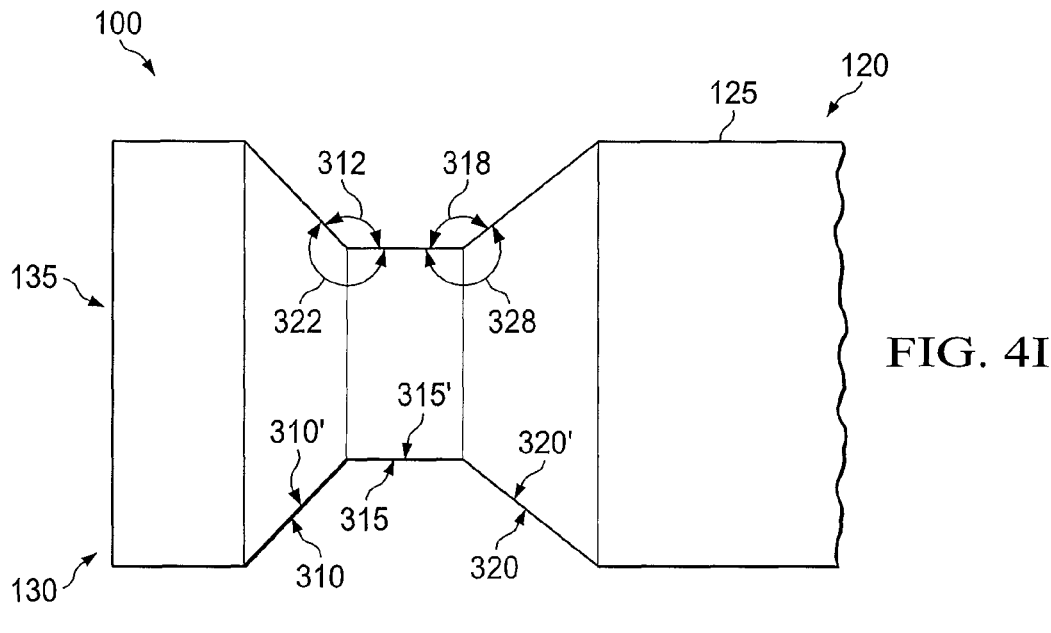

For instance, as shown FIGS. 4H and 4I, the first zone 205 can be configured as one of diverging (FIG. 4H) or converging (FIG. 4I) from a fourth zone 430 of the combustion tube 125 to the second zone 207, and the third zone 209 can be configured as the other of converging (FIG. 4H) or diverging (FIG. 4I) from the second zone 207 to a fifth zone 435 of the combustion tube 125. As illustrated in FIGS. 4H and 4I, the fourth zone 430 is nearer to the end 130 than the three zones 205, 207, 209 and the fifth zone 435 is farther from the end 130 than the three zones 205, 207, 209. As also illustrated in FIGS. 4H and 4I, in some cases, one or more of the second zone 207, fourth zone 430, and fifth zone 435 can be configured as straight zones. Analogous to that discussed in the context of FIG. 3A, in some embodiments, there can be non-straight angles 440, 442, 444, 446 formed between the outer and/or inner surfaces 450, 450', 455, 455' of the fourth and fifth zones 430, 435 and the first and third zones 205, 209, respectively.

As shown in FIGS. 4F-4I, in some embodiments, the second zone 207 can be configured as a straight zone. In such cases, to further enhance fuel air mixing, the second zone 207, configured as a straight zone, can have a length 440 (L) (e.g., FIG. 4F) that is up to about 5 times a hydraulic diameter (DH), of said second zone 207 (e.g., L=5*DH). One of ordinary skill in the art would understand that DH equals 4*A/P, where A is a cross-sectional area of the combustion tube 125 in the second zone 207 and that P is the wetted perimeter of the cross-section of the combustion tube 125 in the second zone 207. One of ordinary skill in the art would be familiar with procedures to determine DH and P.

Figure 4J:
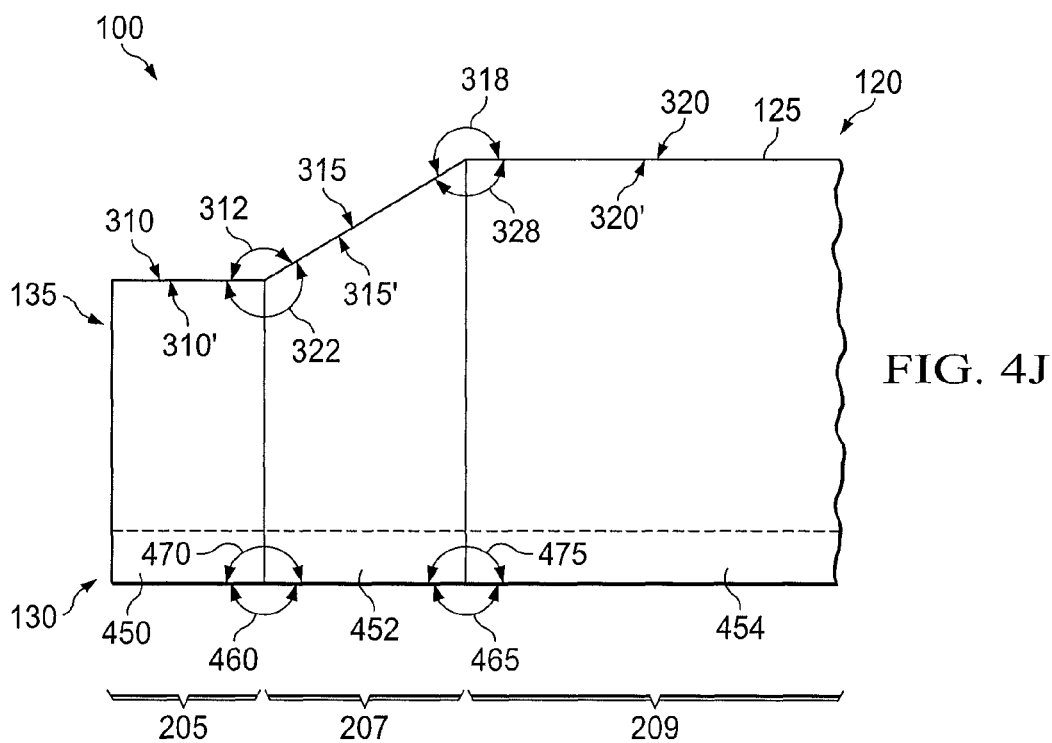

In some embodiments, a portion of one or more of the outer surfaces 310, 315, 320 (and/or inner surfaces 310', 315', 320') of the three zones 205, 207, 209 does not have non-straight angles 312, 318 (and/or angles 322. 328). That is, portions 450, 452, 454 of one or more of the outer surfaces 310, 315, 320 (and/or inner surfaces 310', 315', 320') of one or more of the three zones 205, 207, 209 can form a straight exterior angle 460, 465 with another one of the outer surfaces 310, 315, 320 of the three zones 205, 207, 209. For instance, as shown in FIG. 4J, respective portions 450, 452, 454 of the outer surfaces 310, 315, 320 (and/or inner surfaces 310', 315', 320') can form exterior angles 460, 465 (and/or interior angles 470, 475) of about 180 degrees between the first surface portion 450 and the second surface portion 452 or between the second surface portion 452 and the third surface portion 454.

In some embodiments of the heat exchanger 120, such as shown in FIGS. 1-3, the opening 135 of the combustion tube 125 can be have a substantially circular or elliptical in shape. In such embodiments, the opening spaces within each of the three zones 205, 207, 209, and the outer surfaces 310, 315, 320 of these zones 205, 207, 209 can also have similar circular or elliptical shapes. Based upon the present disclosure, one of ordinary skill in the art would understand that the opening 135 and outer surfaces 310, 315, 320 of the combustion tube 125 could have other types of closed-curve shapes.

As further illustrated in FIGS. 1 and 2, in some embodiments of the heat exchanger 120, the combustion tubes 125 can each include two or more passes 230, 235 each of the passes 230 having a long axis 240, 245. The long axes 240, 245 can be disposed in a substantially parallel relationship and pairs of the passes 230, 235 can be interconnected by a curved pass 250 of the combustion tube. As shown in FIG. 2, the three zones 205, 207, 209 can be located within the first pass 230, which is nearest the burner assembly 105.

One of ordinary skill in the art, based upon the present disclosure, would appreciate the scope of other configurations that zones of the combustion tube 125 could have. One skilled in the art would also appreciate that the particular dimensions and structural configuration of the combustion tube 125 could be adjusted based on other factors to achieve an optimal balance between efficiency, heat exchanger temperature, combustion performance and sound levels.

One of ordinary skill would appreciate that the heating furnace unit 100 would include additional components. As non-limiting examples, the unit 100 can further include a mounting panel 150 configured couple the burner assembly 105 and heat exchanger 120 together. One skilled in the art would understand that the unit could also include other components such as an air circulating means (e.g., an air blower; not shown). The unit 100 can further include a collection assembly 155 that is coupled to an opposite end 160 of the combustion tube 125 which is configured to route exhaust gases to other components of the unit 100 (e.g., secondary heat exchanges, discharge flues, etc. . . . ; not shown). The burner assembly 105 can further include a burner enclosure 165 configured to hold the one or more burners 110 therein and facilitate coupling of the burner assembly 105 to the heat exchanger 120. The heat exchanger 120 can further include one or more frames 170 adapted to hold at least one of the combustion tubes 125 and configured couple the combustion tube 125 openings 135, 160 to the burner assembly 105 and collection assembly 155.

Figure 5:
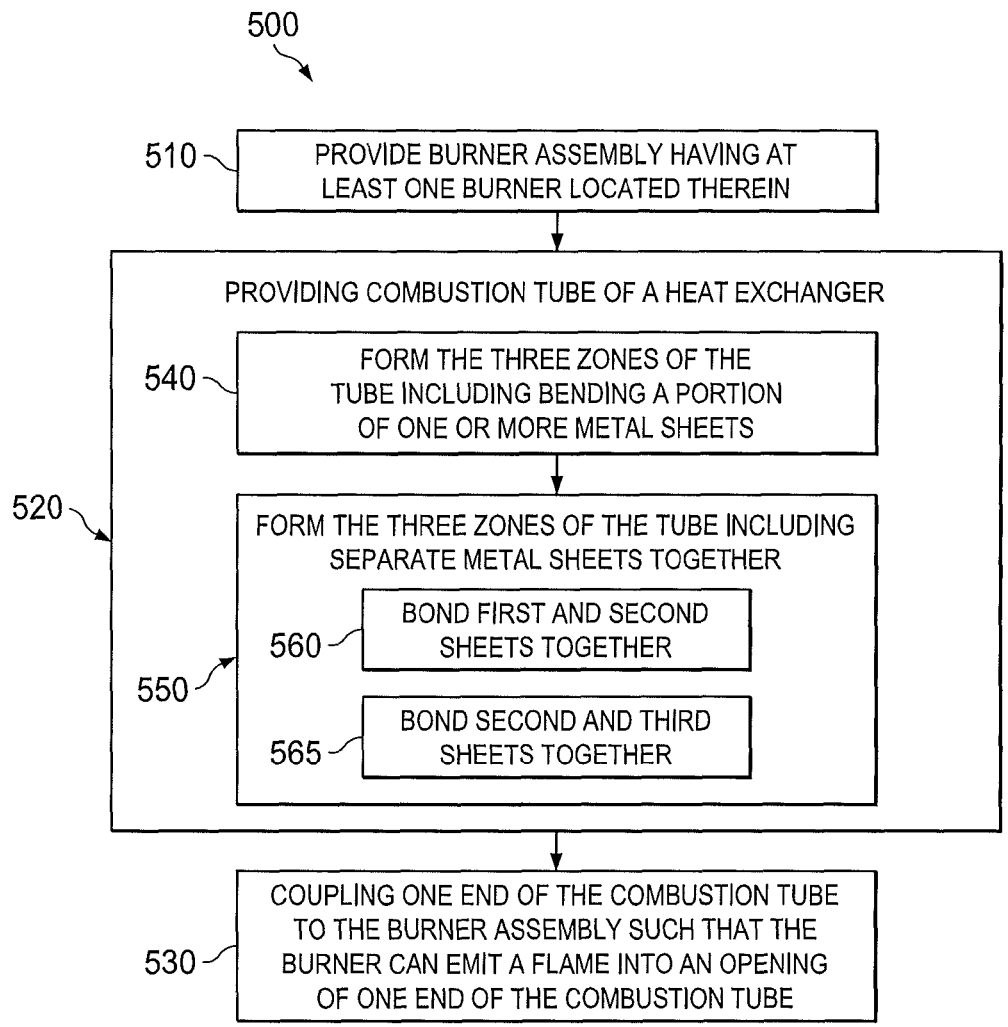
FIG. 5 presents a flow diagram of an example method of manufacturing a unit of the disclosure, such as any of the units depicted in FIGS. 1-4J.

Another embodiment of the present disclosure is a method of manufacturing a heating furnace unit. FIG. 5 presents a flow diagram of an example method 500 of manufacturing a heating furnace unit of the disclosure, such as the heating furnace units 100 with their component parts, as depicted in FIGS. 1-4J, which are referred to throughout.

The method 500 comprises a step 510 of providing a burner assembly having at least one burner located therein. The method 500 also comprises a step 520 of providing a combustion tube 125 of a heat exchanger 120. The method further comprises a step 530 of coupling one end 130 of the combustion tube 125 to the burner assembly 105 such that the at least one burner 110 can emit a flame 210 into an opening 135 of the one end 130 of the combustion tube 125.

As discussed in the context of FIGS. 1-4F the combustion tube 125 has at least three zones 205, 207, 209. A first surface (e.g., outer surface 310 and/or inner surface 310') of the first zone 205 has a first non-straight exterior angle (e.g., exterior angle 312 and/or interior angle 322) with a second surface (e.g., outer surface 315 and/or inner surface 315') of the second zone, and the second surface has a second non-straight angle (e.g., exterior angle 318 and/or interior angle 328) with a third surface (e.g., outer surface 320 and/or inner surface 320') of the third zone 209. The first zone 205 is nearest of the three zones 205, 207, 209 to the burner assembly 105, the second zone is in-between the first zone 205 and third zone 209, and the three zones 205, 207, 209 are within a flame length 215 configured to be emitted from the burner 110.

In some embodiments, the step 520 of providing the combustion tube 125 includes a step 540 of forming the three zones 205, 207, 209 which includes bending a portion of one or more metal sheets (e.g., aluminum sheets) to form the non-straight first angle and the non-straight second angle. In some cases, for instance, one or more of the first, second or third surfaces of a single metal sheet can be bent, as part of step 540, to form the first and second angles to thereby fashion each of the zones 205, 207, 209 into one of converging, diverging or straight zones. In other cases, separate sheets of metal can be bent, as part of step 540, to form separate pieces that correspond to the three zones 205, 207, 209.

In some embodiments, the step 520 of providing the combustion tube 125 includes a step 550 of forming the three zones 205, 207, 209 which includes coupling separate first, second and third metal sheets together to form the first and second angles.

For instance, in some cases coupling the separate first, second and third metal sheets together in step 550 can include a step 560 of bonding the first and the second metal sheets together and a step 565 of bonding the second and the third metal sheets together. Examples of suitable bonding processes include riveting, welding, or bolting the pieces together.

Figure 6:
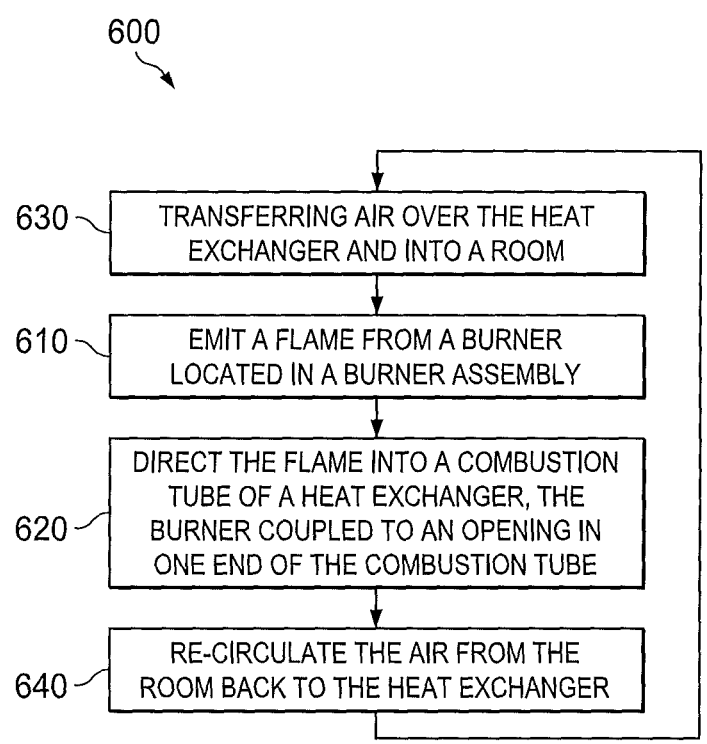
FIG. 6 presents a flow diagram of an example method of using a heating furnace unit of the disclosure, such as any of the units depicted in FIGS. 1-5.

Another embodiment of the present disclosure is a method of using a heating furnace unit. FIG. 6 presents a flow diagram of an example method 600 of manufacturing a heating furnace unit of the disclosure, such as the heating furnace units 100 with their component parts, as discussed in the context of FIGS. 1-5, and which are referred to throughout.

The method 600 comprises a step 610 of emitting a flame 210 from a burner 110 located in a burner assembly 105. One of ordinary skill in the art would be familiar with appropriate gases (e.g., natural gas), gas flows and ignition processes to achieve step 610.

The method also comprises a step 620 of directing the flame 210 into a combustion tube 125 of a heat exchanger 120, the burner 110 coupled to an opening 135 in one end 130 of the combustion tube 125. The combustion tube 125 has three zones 205, 207, 209 configured as previously described in the context of FIG. 1-4J and FIG. 5. The three zones are within a flame length 215 emitted from the burner 110.

Forced mixing of the gases by passing the gases and flame through the three zones 205, 207, 209 facilitates the early release of heat in the combustion tube 125 resulting in a uniform temperature in the combustion tube 125. One ordinary skill in the art would be familiar with procedures to measure the temperature in combustion tube 125, e.g., using commercially available thermal imaging equipment.

In some embodiments, under a steady-state output of the flame 210 (e.g., from a constant flow of gases into the burner 110), at least a first passage 230 and a second passage 235 of the combustion tube 125 have a substantially same average temperature (e.g., within about ±10 percent). In some embodiments of the combustion tube 125, having more than two passes, the average temperature in any one pass is substantially the same (e.g., within about ±10 percent) as the average temperature in any other pass. Additionally, the resulting uniform temperature throughout the combustion tube 125 with the three zones 205, 207, 209 facilitates having a low average temperature throughout the entire tube 125. For instance, in some cases, with a steady-state output of the flame 210, the average temperature in the first passage 230 and the second passage 235 of the combustion tube 125 equals about 650° F. or less.

One skilled in the art would appreciate that the method 600 could include additional steps to using a heating furnace unit 100, e.g., to heat a building or other enclosed structure. Non-limiting examples of such steps could include transferring air over the heat exchanger 120 and into a room (step 630) and re-circulating the air from the room back to the heat exchanger 120 (step 640).

Those skilled in the art to which this application relates will appreciate that other and further additions, deletions, substitutions and modifications may be made to the described embodiments.

What is claimed is:

1. A heating furnace unit, comprising: a mounting panel; a burner assembly mounted to one side of said mounting panel, said burner assembly having at least one burner located therein; and a heat exchanger mounted to an opposite side of said mounting panel, said heat exchanger having at least one continuous combustion tube, wherein said combustion tube includes at least a first pass and a second pass, said first and second passes interconnected by a curved pass of said combustion tube, one end of said combustion tube having a first opening that is coupled to said burner assembly, wherein said combustion tube has at least three zones, a straight first surface of said first zone said straight surface extending an entire length of the first zone and is substantially parallel with a direction of a flame emitted by the one burner during an operation of the heating furnace and forming has a first non-straight angle with a second surface of said second zone, said second surface has a second non-straight angle with a third surface of said third zone, said first zone is nearest of said three zones to said burner assembly and extends to said first opening and said second zone is in-between said first zone and said third zone, said first, second and third zones are within a flame length configured to be emitted from said burner, said first non-straight angle is located on said opposite side of said mounting panel, and said first non-straight angle and said second non-straight angle are within said first pass and are nearer to said first opening than an upstream end of said curved pass.

2. The unit of claim 1, wherein said second zone is a diverging zone with said first non-straight angle between 0 and 180 degrees.

3. The unit of claim 1, wherein said second surface of said second zone linearly diverges from said first zone to said third zone.

4. The unit of claim 1, wherein said second surface of said second zone curvilinearly diverges from said first zone to said third zone.

5. The unit of claim 1, wherein said second zone is a converging zone with said first non-straight angle greater than 180 degrees.

6. The unit of claim 1, wherein a portion of one or more outer surfaces of one or more of said three zones forms a straight angle with another one of said outer surfaces of said three zones.

7. The unit of claim 1, wherein said first, said second and said third surfaces include exterior surfaces of said first, said second and third zones, respectively, and, said first and second non-straight angles are exterior angles.

8. The unit of claim 1, wherein said first pass and said second pass each have a long axis, said long axes disposed in a substantially parallel relationship.

9. The unit of claim 1, wherein a second opening at an opposite end of said continuous combustion tube is coupled to a collector assembly of said unit.

10. A method of manufacturing a heating furnace unit, comprising: providing a mounting panel; providing a burner assembly having at least one burner located therein; providing a combustion tube of a heat exchanger, wherein said combustion tube includes at least a first pass and a second pass, said first and second passes interconnected by a curved pass of said combustion tube; mounting said burner assemble to one side of said mounting panel; mounting said heat exchanger to an opposite side of said mounting panel; and coupling one end of said combustion tube to said burner assembly such that said at least one burner can emit a flame into an opening in said one end, wherein: said combustion tube has at least three zones, a straight first surface of said first zone said straight surface extending an entire length of the first zone and is substantially parallel with a direction of a flame emitted by the one burner during an operation of the heating furnace and forming gas a first non-straight angle with a second surface of said second zone, said second surface has a second non-straight angle with a third surface of said third zone, said first zone is nearest of said three zones to said burner assembly and extends to said first opening and said second zone is in-between said first zone and said third zone, said first, second and third zones are within a flame length configured to be emitted from said burner, said first non-straight angle is located on said opposite side of said mounting panel, and said first non-straight angle and said second non-straight angle are within said first pass and are nearer to said first opening than an upstream end of said curved pass.

11. The method of claim 10, wherein providing said combustion tube includes forming said three zones including bending a portion of one or more metal sheets to form said first non-straight angle and said second non-straight angle.

13. The method of claim 10, wherein providing said combustion tube includes forming said three zones, including coupling separate first, second and third metal sheets together to form said first non-straight angle and said second non-straight angle.

13. The method of claim 12, wherein coupling said separate first, second and third tubes together includes bonding said first and said second pieces together and bonding said second and said third pieces together.

* * * * *